United States Patent Office 3,406,204
Patented Oct. 15, 1968

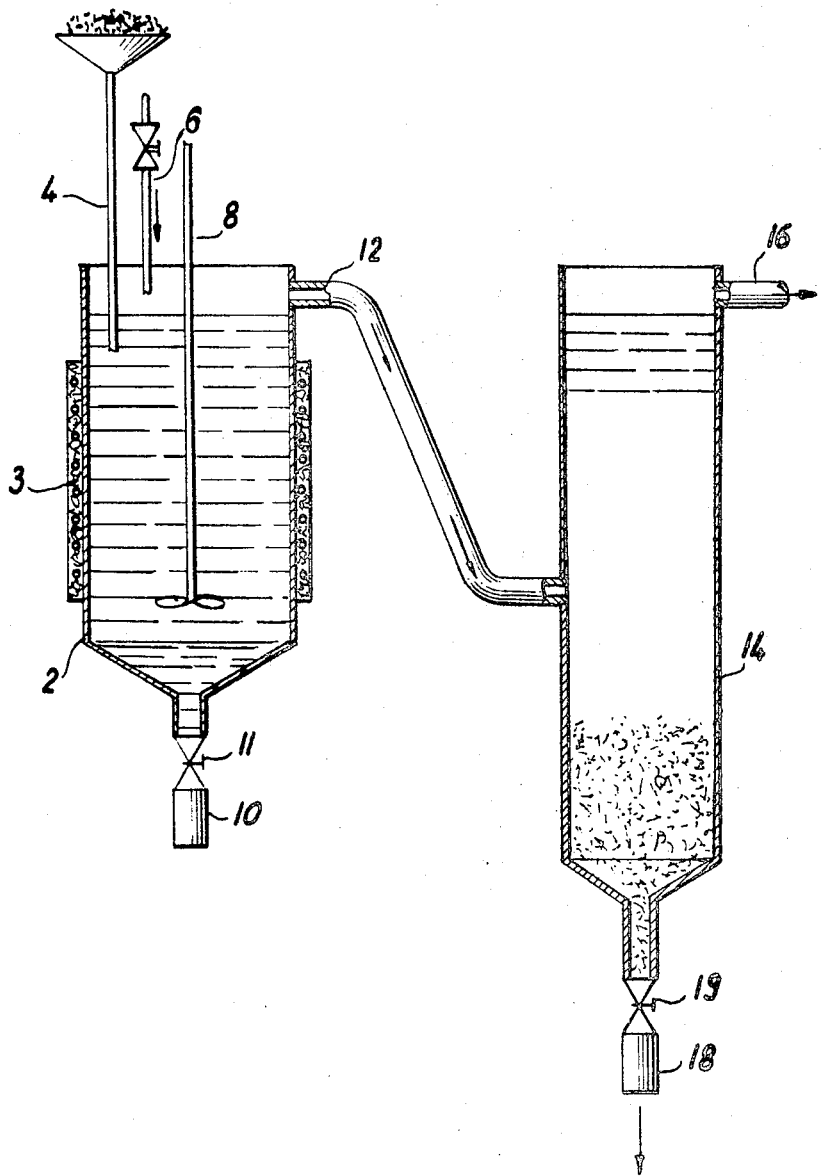

3,406,204
PROCESS FOR THE PURIFICATION AND DE-
CONTAMINATION OF TERTIARY ALIPHATIC
AMINE SOLVENTS
André Bathellier, Sceaux, and Jean-Jacques Perez,
Maisons-Alfort, France, assignors to Commissariat
à l'Energie Atomique, Paris, France
Filed Aug. 17, 1965, Ser. No. 480,326
Claims priority, application France, Aug. 17, 1964,
985,363
5 Claims. (Cl. 260—583)

ABSTRACT OF THE DISCLOSURE

This invention relates to a process for the purification and decontamination of organic solvents constituted by tertiary amines.

Background of the invention

The process generally comprises contacting the amine solvent with an activated alumino-silicate at a temperature of from 40 to 50° C. for a period of from 5 to 50 minutes. The amount of activated alumino-silicate used preferably represents from about 3 to 10% by weight of the solvent to be processed.

Trilaurylamine in dodecoic acid solution is widely employed as an industrial solvent for the purification of plutonium in a nitric acid solution. However, this solvent loses part of its chemical purity during use and therefore has to be purified.

The purification of plutonium generally comprises an extraction of the nitric acid complex of this metal followed by a re-extraction by sulphuric acid and regeneration by means of a mineral base. The solvent which is re-extracted then appears in the form of a stoichiometric nitrate of trilauramine in dodecoic acid solution. A regeneration of the amine in the form of free base by a mixture of caustic soda and carbonate is then carried out. Trilaurylamine (TLA) contains as principal impurities di-laurylamine (DLA) and its laureate which are troublesome on account of their low solubility in dodecoic acid phase. The laurate of DLA can also produce during the basic regeneration emulsions of the colloidal type which make the decantation of these solutions difficult to perform.

Up to the present time, the removal of DLA was carried out by passing the solvent mixture through an alumina-packed column. However, this method is fairly costly, has a certain degree of sensitivity to moisture-laden air and finally does not permit of rapid processing of large quantities of solvent.

canting the activated earth in order to recover the purified solvent.

This process, aside from the fact that it is economically advantageous, does not exhibit any appreciable sensitivity to moisture-laden air and permits a larger capacity to be processed and consequently a saving in time. Since this process can be carried out in large containers instead of alumina-packed columns, the technology is accordingly simplified to a considerable degree.

The activated natural earths employed are complex silico-aluminates which are prepared by acid activation of colloidal clays of smectic nature such as bentonites. This activation endows said complex silico-aluminates with enhanced adsorption properties.

In short, it can be stated that the adsorption process results from the action of Van der Waals forces which are developed between the molecules of adsorbable impurities and the active surface of the adsorbent. Under predetermined conditions of temperature and agitation, the impurities which are concentrated in the vicinity of the surface of the activated earth particles can be fixed by their polar grouping. In the case of a tertiary amine/secondary amine mixture, the adsorption of the secondary amine, which has a higher polarity than the tertiary amine by virtue of its N—H linkage, is carried out selectively. The tertiary amine, on the other hand, is fixed only as a result of induced polarity, with the result that its adsorption is considerably lower.

The processing conditions depend first on the nature of the activated earth and on a certain number of parameters among which can be mentioned the temperature, processing time and percentage of activated earth employed.

Among the activated earths which are suitable for the practical application of this invention, there can be cited by way of example the activated earths known as Clarsil PC1, LE1, LE2 or Actisil T, TS, TSL; advantageous use can also be made of mixtures of these activated earths with active carbons such as Acticarbone S, 2S or Negrisil 21,291. These active carbons serve to complete the action of the earths in two ways as follows:

(a) By discoloring the solvent
(b) By fixing another impurity of the solvent, namely TLA, which is an intermediate stage in the degradation process which results in the final production of the DLA laurate.

Table I below summarizes the results obtained with the different activated earths employed; tests were carried out at 25° C. over a period of 30 minutes with a quantity of earth equal to 10% by weight of the solvent processed.

TABLE I

| Sample No. | Nature of activated earth | TLA+DLA in moles per liter | TLA in moles per liter | DLA in moles per liter | Percent by weight of DLA with respect to TLA | Processing yield DLA, percent removed | Loss TLA, percent |
|---|---|---|---|---|---|---|---|
| 1 | Untreated | 0.3030 | 0.2777 | 0.0253 | 6.19 | | |
| 2 | LE 1 | 0.2750 | 0.2662 | 0.0088 | 2.24 | 64 | 4.1 |
| 3 | PC 1 | 0.2700 | 0.2638 | 0.0062 | 1.60 | 74 | 5.0 |
| 4 | LE 2 | 0.2670 | 0.2617 | 0.0053 | 1.37 | 78 | 5.8 |
| 5 | T+2S | 0.2680 | 0.2631 | 0.0049 | 1.26 | 80 | 5.3 |
| 6 | T+S | 0.2690 | 0.2645 | 0.0045 | 1.15 | 81 | 4.8 |
| 7 | T | 0.2690 | 0.2645 | 0.0045 | 1.15 | 81 | 4.8 |
| 8 | TS | 0.2650 | 0.2609 | 0.0041 | 1.06 | 83 | 6.0 |
| 9 | TSL | 0.2620 | 0.2596 | 0.0024 | 0.63 | 90 | 6.5 |

The present invention circumvents the disadvantages referred-to. The invention has for its object a method of purification of tertiary amin which consists in contacting the amine to be purified with an activated natural earth at a sufficiently high temperature and over a sufficient period of time to purify and decontaminate it, and in de- It is apparent from the results which have been tabulated above that the earths known as Actisil T, TS and TSL have better specificity with respect to DLA. Actisil TSL is of the same quality as Actisil TS but has a smaller particle size, and this property is liable to result in certain disadvantages, especially at the time of decantation.

In the case of the mixtures T+S and T+2S, the results obtained in the removal of DLA are of the same order as those obtained when employed the earths alone. However, as has been mentioned earlier, there is additionally obtaind complete discoloration of the solvent as well as removal of the oxide of TLA.

The influence of temperature has been determined by using an activated earth Actisil TSL in a quantity corresponding to 10% by weight of the solvent to be processed and by contacting continuously over a period of 45 minutes. Tests have shown that maximum processing efficiency was obtained in respect of a temperature within the range of 40 to 50° C.

The influence of the processing time on its efficiency has been analyzed by employing a percentage of earths corresponding to 20% by weight of the solvent to be processed and by contacting at a temperature of 48° C. Tests carried out have shown that the process was efficient for a length of time comprised between 5 and 50 minutes and perferably in the vicinity of 10 minutes. The loss of adsorbed TLA remains practically constant after a processing time of 10 minutes; said TLA is readily recovered by washing the activated earth with dodecane, for example.

However, the activated earth can first be contacted with a small quantity of pure solvent if so desired.

The efficiency of removal of DLA is in no way impaired by such a preliminary treatment.

The influence of the percentage of activated earths employed is highly important and has been studied in the case of different activated earths at a temperature in the vicinity of 45° C. and over a period of time varying between 10 and 45 minutes. The results obtained have shown that a percentage of earths within the range of 3 to 10% by weight of the solvent to be processed permits of sufficient purification of DLA without entailing too substantial losses of TLA by adsorption.

The mean values of the results obtained by treating TLA with an activated earth such as Actisil TS at a temperature in the vicinity of 45° C. with contacting times ranging from 10 to 45 minutes and using different percentages of activated earth are recorded in Table II below:

TABLE II

| Activated earth, percent | DLA removed | Loss DLA, percent |
|---|---|---|
| 5 | 55±10 | 2.6±0.9 |
| 10 | 86± 7 | 5±0.9 |
| 15 | 93± 4 | 7.6±1.3 |
| 20 | 97± 2 | 11.1±1 |
| 25 | 98± 1.5 | 14.7±1.6 |

In addition to the purification of TLA, treatment by means of activated earths makes it possible to reduce to a substantial degree the settling time of the solvent in the presence of aqueous phases. Moreover, this treatment makes it possible to improve the decontamination factor of TLA with respect to the fission products and especially with respect to zirconium, niobium and ruthenium. In fact, a few fission products which include zirconium, niobium and ruthenium can be extracted from TLA.

A first decontamination of the solvent is carried out at the time of regeneration in the form of free base in the presence of a mineral base; the second decontamination is obtained at the time of the purification treatment with activated earths. By way of indication, approximately 85 to 90% of the residual activity of the solvent are thus fixed by the activated earth Actisil TS which is employed in a proportion of 5% by weight of the solvent to be processed. By way of example, 1 liter of trilaurylamine of 20% concentration in dodecane derived from the final stage of purification of plutonium has been treated with 5% by weight of the activated earth Actisil TS for a period of 10 minutes at a temperature of 40° C. The decontamination factors obtained in the case of the pair $Zr^{95}$–$Nb^{95}$ and the case of the pair $Ru^{106}$–$Rh^{106}$ were respectively 5 and 5.75.

The process according to the invention is of a general application. It allows to eliminate from solvents, impurities which are more polar than the solvent itself. If it can be used for example for the purification of tributylphosphate, it will be however preferable to apply the process of purification by carbonates which has the advantages of the liquid-liquide extraction process.

It can be applied to the purification of all tertiary amins. In this way the tricaprylylamine commercialized under the designation Alamine 333 has been purified in handling it during ¼ hr. by a temperature of 45° C. with 10% in weight of activated earth Actisil TS. The dicaprylylamine contained in the amin has been completely eliminated.

The treatment is carried out by means of any conventional apparatus and especially by means of the apparatus shown in the single figure annexed hereto.

The apparatus comprises a mixer 2 surrounded by a heating jacket 3 fitted with conventional heating means such as an electric resistance 5. Said mixer is supplied with activated earth by means of a pipe 4 connected to a distributor which is not shown in the figure and is fitted with an inlet tube 6 for the admission of solvent to be processed as well as with a stirrer 8 for the purpose of ensuring good contact between the activated earth and the solvent to be purified.

Said mixer 2 is also provided with an outlet tube 10 fitted with a valve 11 for draining-off the mixer and located at the bottom of this latter. Provision is made at the top of the mixer for an outlet tube 12 for the overflow discharge of processed solvent which is thus conveyed towards a settling column 14 in which the separation of the purified solvent from the spent activated earth is carried out.

There is located at the top end of the column 14 an outlet tube 16 for the discharge of decanted solvent and at the bottom end of the column a tube 18 fitted with a valve 19 for removing the sludges which consist of a mixture of solvent and spent activated earths.

The operation of this plant is apparent from the foregoing description and will therefore be described only briefly.

The mixer 2 is fed in a continuous manner with a tertiary amin by means of the tube 6 and is also supplied with activated earths in a continuous manner by means of the tube 4. The activated earth distributor is regulated in such a manner as to introduce a predetermined percentage by weight of activated earths and the heating of the mixer jacket 3 is regulated in such a manner as to maintain a tempera'ure in the vicinity of 45° C. within the mixer.

After a predetermined period of time which is preferably of the order of 10 minutes, the processed solvent and the earth in suspension are discharged from the mixer 2 through the overflow 12 and are directed towards the settling column 14 which carries out the separation of the solvent from the earth.

The decanted and purified solvent passes out through the overflow 16 and the sludge is discharged through the tube 18 towards a filter system of conventional type which is not shown in the figure and which effects the separation of the earth; the filtered solvent is recovered.

This apparatus for the practical application of the process according to the invention has been described solely by way of non-limitative example. It would equally be possible to employ any conventional equipment which permits of an effective solid-liquid contact followed by the decantation of the aggregate for the purpose of recovering the purified liquid.

What we claim is:

1. A process for the purification and decontamination of a tertiary aliphatic amine solvent which comprises contacting said solvent with an activated silico-aluminate prepared by acid activation of colloidal clay, said silico-aluminate being used in an amount which constitutes from about 3 to 10% by weight of said solvent to be purified and said contacting being carried out for from 5 to 50 minutes at a temperature of from about 40° to 50° C.

2. A process according to claim 1 wherein said tertiary amine is trilaurylamine.

3. A process according to claim 1 wherein said tertiary amine is tricaprylylamine.

4. A process according to claim 1 wherein said activated silico-aluminate is mixed with activated carbon.

5. A process according to claim 1 wherein:
 (a) the amine is trilaurylamine;
 (b) the silico-aluminate is used in an amount representing about 10% by weight of said solvent; and
 (c) the contacting is performed at about 25° C. for about 30 minutes.

References Cited

UNITED STATES PATENTS 3,005,826   10/1961   Fleck et al. _____ 260—583 X

CHARLES B. PARKER, *Primary Examiner.*

R. L. RAYMOND, *Assistant Examiner.*